(No Model.)
R. B. REYNOLDS.
LAWN MARKER.
No. 300,507. Patented June 17, 1884.
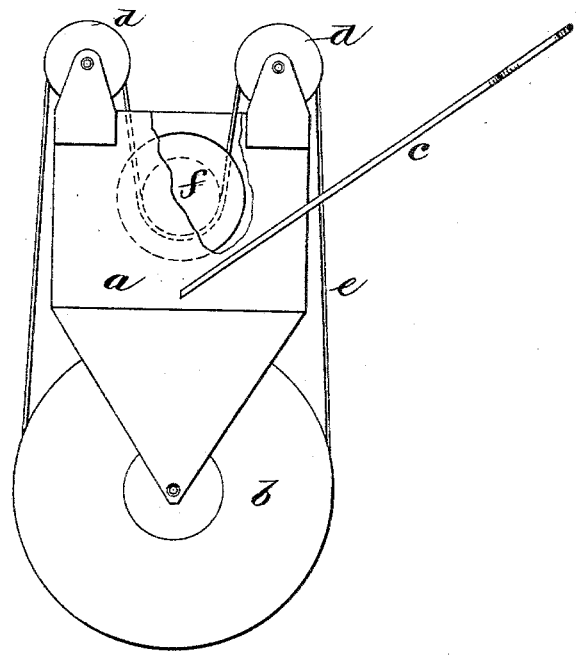
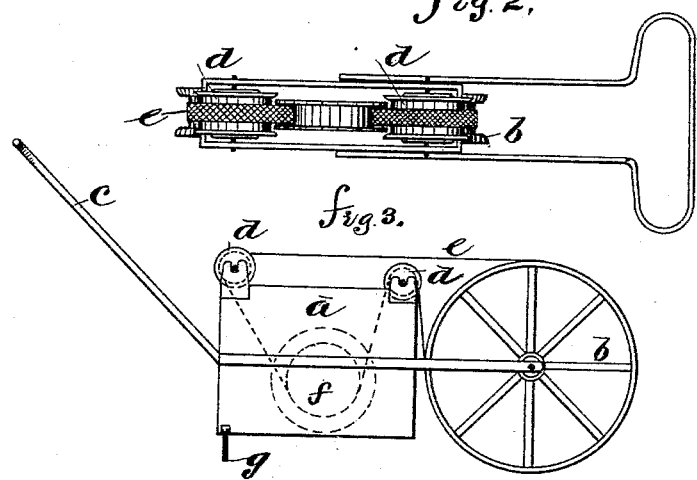
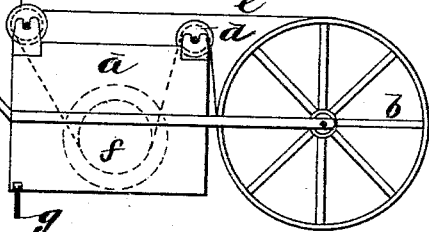
WITNESSES:
INVENTOR
Robt B Reynolds
BY A. P. Thayer
ATTORNEY

UNITED STATES PATENT OFFICE.

ROBERT B. REYNOLDS, OF STOCKPORT, NEW YORK.

LAWN-MARKER.

SPECIFICATION forming part of Letters Patent No. 300,507, dated June 17, 1884.

Application filed October 5, 1883. (No model.)

*To all whom it may concern:*

Be it known that I, ROBERT B. REYNOLDS, a citizen of the United States, residing at Stockport, in the county of Columbia and State of New York, have invented new and useful Improvements in Lawn-Markers, of which the following is a specification.

My invention consists of an improved machine for marking the lines required on the lawn for playing lawn-tennis, said machine consisting of a small tank, to contain the whitewash or other liquid substance used, mounted on a wheel adapted to be rolled on the lawn, and provided with handles for rolling it, said wheel having an endless belt fitted on its periphery and running over guide-rollers into the tank through the liquid to take on and carry the same down to and deliver it on the lawn by rolling over it in regular and suitable measure, to make the marks much more rapidly and with less labor than they can be made in the ordinary way, all as hereinafter fully described, reference being made to the accompanying drawings, in which—

Figure 1 is a side elevation of my improved lawn-marker. Fig. 2 is a top or plan view, and Fig. 3 is a side elevation, of a modified form of the machine.

I make a can or tank, $a$, of tin, sheet iron, or any other approved material and proper size, and mount it on a wheel, $b$, of suitable size for rolling along over the lawn, with a handle, $c$, of any approved kind, by which to push or pull the machine, attached to the tank, said tank being preferably located directly over the top of the wheel, and at its top it has a guide-roller, $d$, pivoted in suitable bearings at each end, over which the endless belt $e$, fitted to the wheel $b$, runs, to pass through the liquid in the tank by running under the roller $f$ therein, and resting in the bight of the belt passing under it, said roller $f$ serving to stir up or agitate the liquid and to cause the belt to run through the liquid, and also for a tightener to the belt. The wheel $b$, guide-rollers $d$, and the roller $f$ are all suitably flanged for guiding the belt and effectually preventing it from running off.

It will be seen that the belt will work effectually in taking on the marking-liquid and laying it on the lawn uniformly and as rapidly as it may be desired to push or pull the machine along. The quantity of the liquid laid on by the belt may be varied to suit by the thickness of the mixture; or scrapers may be employed to scrape off more or less, said scrapers being located in the upper part of the tank, where the liquid scraped off will fall back into the tank.

The box may be arranged over the wheel $b$, as in Fig. 1, or back of it, as in Fig. 2, as preferred. In the latter case the box may be provided with legs $g$, to hold it upright when not supported by the hands.

What I claim, and desire to secure by Letters Patent, is—

The combination, with the liquid-tank $a$, mounted on the carrying-wheel $b$, and the belt $e$, arranged to run on the carrying-wheel, of the guide-rollers $d$, located on opposite sides of the top of the tank, and the tension and stirring roller $f$, arranged to be suspended and carried in the bight of the belt, and to cause the belt to run through the liquid in the tank, substantially as described.

In witness whereof I have hereunto signed my name in the presence of two subscribing witnesses.

ROBERT B. REYNOLDS.

Witnesses:
JOHN CHITTENDEN,
A. J. DOLAND.